US012694855B2

(12) United States Patent
Stone

(10) Patent No.: US 12,694,855 B2
(45) Date of Patent: Jul. 28, 2026

(54) ADJUSTABLE EFFECTS PEDAL STAND

(71) Applicant: Daniel Phillip Stone, Grosse Ile, MI (US)

(72) Inventor: Daniel Phillip Stone, Grosse Ile, MI (US)

( * ) Notice: Subject to any disclaimer, the term of this patent is extended or adjusted under 35 U.S.C. 154(b) by 315 days.

(21) Appl. No.: 18/421,249

(22) Filed: Jan. 24, 2024

(65) Prior Publication Data

US 2025/0239240 A1 Jul. 24, 2025

(51) Int. Cl.
*G10G 5/00* (2006.01)

(52) U.S. Cl.
CPC .................................... *G10G 5/005* (2013.01)

(58) Field of Classification Search
CPC ................................. G10G 5/005; G10G 5/00
See application file for complete search history.

(56) References Cited

U.S. PATENT DOCUMENTS 5,452,951 A * 9/1995 Peller ........................ H05K 7/16 108/6
2011/0271821 A1* 11/2011 Mckinney .............. G10H 1/348 84/746

* cited by examiner

*Primary Examiner* — Kimberly R Lockett
(74) *Attorney, Agent, or Firm* — The Rapacke Law Group, P.A.

(57) ABSTRACT

The disclosed effects pedal stand can include a first board; a second board attached to the first board; a third board attached to the second board; a platform rotatably connected to the second board; a bottom board attached to the first board, the second board, and the third board; a first leg rotatably connected to a bottom side of the platform; and a plurality of stops arranged along the bottom board in a first direction, wherein the plurality of stops are constructed and arranged to receive the first leg at respective positions on the bottom board along the first direction so that the platform is able to be held at respective angles relative to the bottom board.

18 Claims, 8 Drawing Sheets

ADJUSTABLE EFFECTS PEDAL STAND

TECHNICAL FIELD

The embodiments generally relate to the field of effects pedal stands.

BACKGROUND

Effects pedal stands commonly have non-adjustable platforms for supporting effects pedals.

There is a need for an effects pedal stand that includes an adjustable platform for supporting effects pedals.

SUMMARY

This summary is provided to introduce a variety of concepts in a simplified form that is further disclosed in the detailed description of the embodiments. This summary is not intended to identify key or essential inventive concepts of the claimed subject matter, nor is it intended for determining the scope of the claimed subject matter.

In general, the disclosed effects pedal stand can include a first board; a second board attached to the first board; a third board attached to the second board; a platform rotatably connected to the second board; a bottom board attached to the first board, the second board, and the third board; a first leg rotatably connected to a bottom side of the platform; and a plurality of stops arranged along the bottom board in a first direction, wherein the plurality of stops are constructed and arranged to receive the first leg at respective positions on the bottom board along the first direction so that the platform is able to be held at respective angles relative to the bottom board.

Other illustrative variations within the scope of the invention will become apparent from the detailed description provided hereinafter. The detailed description and enumerated variations, while disclosing optional variations, are intended for purposes of illustration only and are not intended to limit the scope of the invention.

BRIEF DESCRIPTION OF THE DRAWINGS

A more complete understanding of the embodiments, and the attendant advantages and features thereof, will be more readily understood by references to the following detailed description when considered in conjunction with the accompanying drawings wherein.

Figure 1:
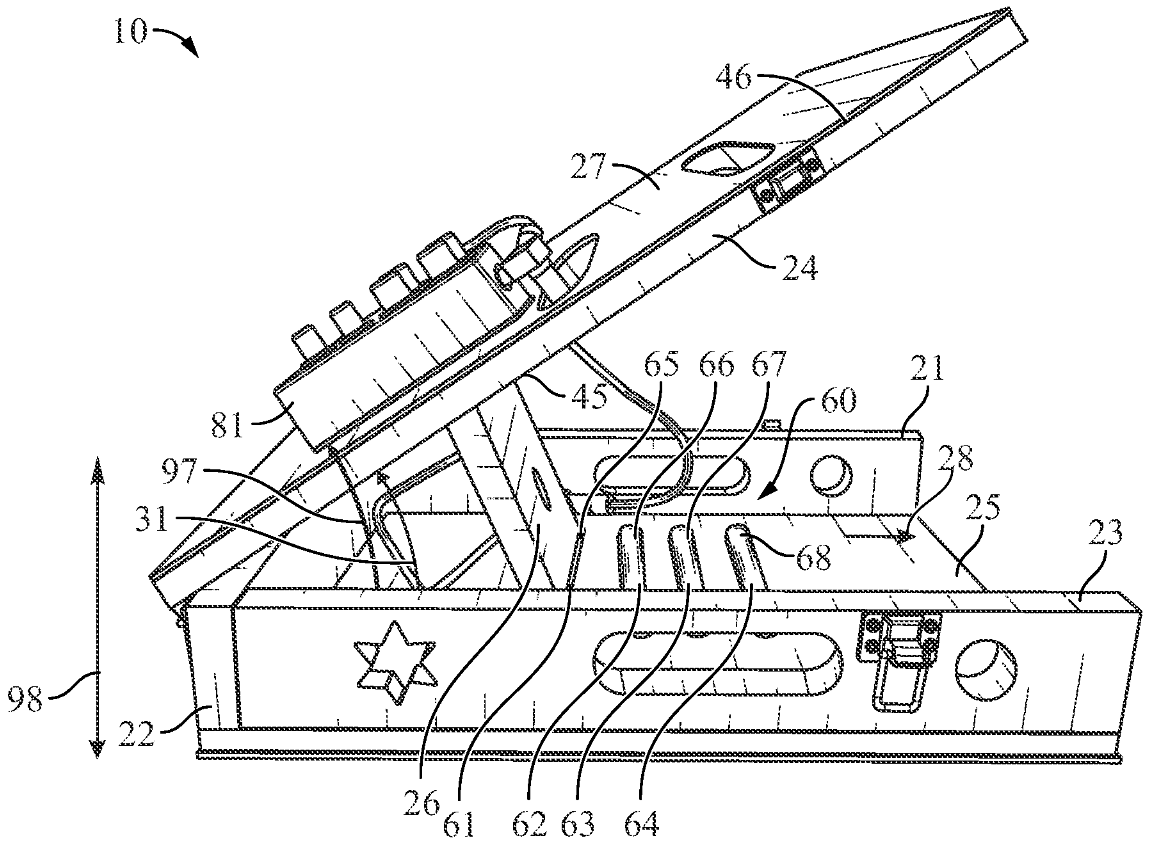
FIG. 1 illustrates a side view of an effects pedal stand that includes a platform held at a first angle, according to some embodiments disclosed herein.

The drawings are not necessarily to scale, and certain features and certain views of the drawings may be shown exaggerated in scale or in schematic in the interest of clarity and conciseness.

DETAILED DESCRIPTION

The specific details of the single embodiment or variety of embodiments described herein are to the described product or methods of use. Any specific details of the embodiments are used for demonstration purposes only and no unnecessary limitations or inferences are to be understood from there.

It is noted that the embodiments reside primarily in combinations of components and procedures related to the products. Accordingly, the product and components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

In general, the embodiments described herein relate to an effects pedal stand. In some embodiments, the effects pedal stand can include a platform rotatably connected to a side board of the effects pedal stand. In some embodiments, the platform can be constructed and arranged to support at least one or more effects pedals (e.g., one or more multi-effects pedals, guitar pedals, etc.) during use (e.g., while a user steps on any of the one or more effects pedals).

In some embodiments, the effects pedal stand can include at least a first leg rotatably connected to a bottom side of the platform. In some embodiments, the effects pedal stand can include a plurality of stops arranged along a bottom board in a first direction, wherein the plurality of stops are constructed and arranged to receive the first leg at respective positions on the bottom board along the first direction so that the platform is able to be held at respective angles relative to the bottom board. A user can control the orientation (e.g., height, angle) of any effects pedal on the platform by adjusting the angle at which the platform is held by the first leg.

In some embodiments, any board of the effects pedal stand, including the platform, can be made primarily of any suitable durable material, such as, for example, wood, metal, plastic, any other suitable durable material, or any combination thereof.

Referring to FIG. 1, an effects pedal stand 10 can include a first board 21. In some embodiments, the effects pedal stand 10 can include a second board 22 attached to (e.g., integrated with, fastened to, or otherwise connected to) the first board 21. In some embodiments, the effects pedal stand 10 can include a third board 23 attached to the second board 22.

In some embodiments, the effects pedal stand 10 can include a platform 24 rotatably connected to the second board 22. In some embodiments, the effects pedal stand 10 can include a bottom board 25 attached to the first board 21, the second board 22, the third board 23, or any combination thereof.

In some embodiments, the effects pedal stand 10 can include at least a first leg 26 rotatably connected to a first side 45 (e.g., bottom side) of the platform 24. In some embodiments, the effects pedal stand 10 can include a plurality of stops 60 arranged along the bottom board 25 in a first direction 28, wherein the plurality of stops 60 are constructed and arranged to receive the first leg 26 at respective positions 65, 66, 67, 68 on the bottom board 25 along the first direction 28 so that the platform 24 is able to be held at respective angles (e.g. 31 in FIG. 1, 32 in FIG. 2, 33 in FIG. 3, 34 in FIG. 4) relative to the bottom board 25. Thus, an angle between the platform 24 and the bottom board 25 can be adjustable.

In some embodiments, the plurality of stops 60 can include at least a first stop 61 at a first position 65, a second stop 62 at a second position 66, a third stop 63 at a third position 67, a fourth stop 64 at a fourth position 68, or any combination thereof, on the bottom board 25. In some embodiments, the first stop 61 can be constructed and arranged to receive the first leg 26 so that the platform 24 is held at a first angle 31 with respect to the bottom board 25. In some embodiments, the first stop 61 can be constructed and arranged to prevent the first leg 26 from moving along the bottom board 25 in the first direction 28.

In some embodiments, the effects pedal stand 10 can include a layer 27 of gripping material on a second side 46 (e.g., top side) opposite the first side 45 of the platform 24. In some embodiments, the layer 27 of gripping material can be made primarily of rubber. In some embodiments, the layer 27 of gripping material can be constructed and arranged to provide traction to at least one effects pedal 81 on the platform 24.

An orientation of any effects pedal on the platform 24, including the effects pedal 81, is adjustable by adjusting the angle between the platform 24 and the bottom board 25. For example, an angle 97 between the effects pedal 81 and a height 98 of the effects pedal 81 can be adjusted by adjusting the angle between the platform 24 and the bottom board 25.

Figure 2:
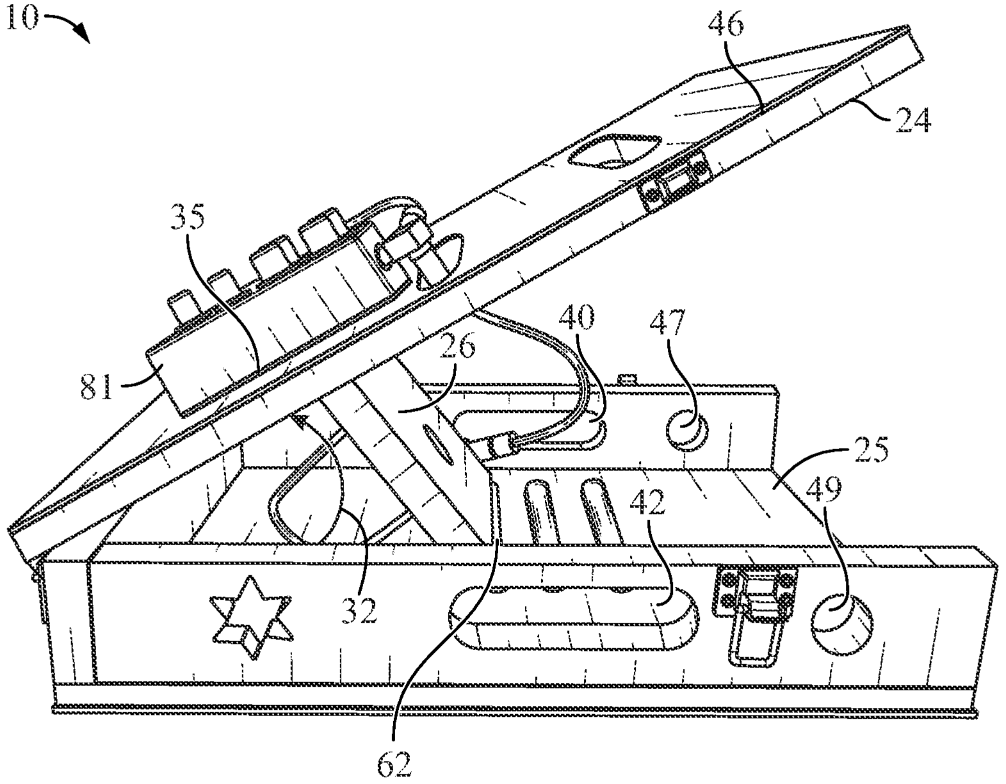
FIG. 2 illustrates a side view of an effects pedal stand that includes a platform held at a second angle, according to some embodiments disclosed herein.

Referring to FIG. 2, in some embodiments, the second stop 62 can be constructed and arranged to receive the first leg 26 so that the platform 24 is held at a second angle 32 with respect to the bottom board 25. The second angle 32 can be smaller than the first angle 31 in FIG. 1. In some embodiments, the second stop 62 can be constructed and arranged to prevent the first leg 26 from moving along the bottom board 25 in the first direction 28.

Figure 3:
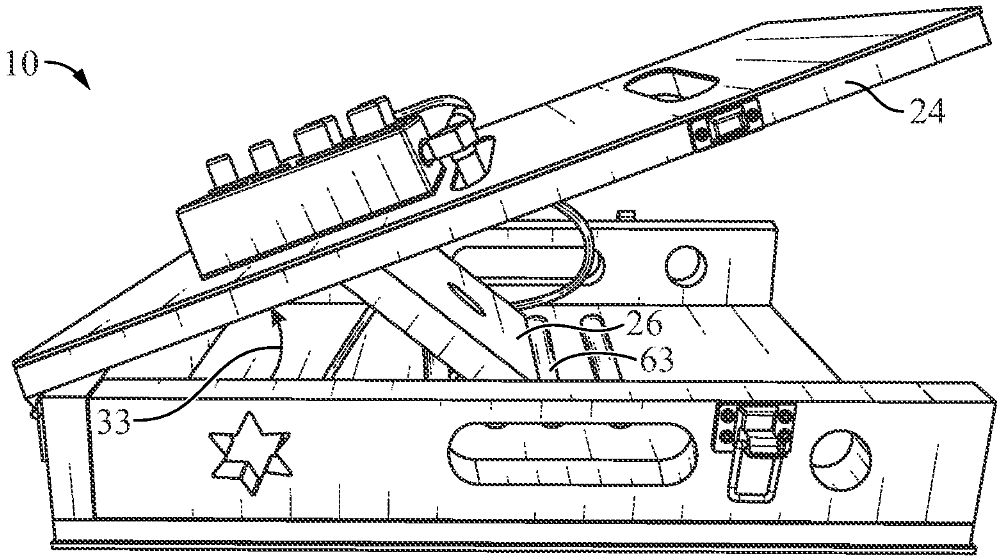
FIG. 3 illustrates a side view of an effects pedal stand that includes a platform held at a third angle, according to some embodiments disclosed herein.

Referring to FIG. 3, the third stop 63 can be constructed and arranged to receive the first leg 26 so that the platform 24 is held at a third angle 33 with respect to the bottom board 25. The third angle 33 can be smaller than the second angle 32 in FIG. 2. In some embodiments, the third stop 63 can be constructed and arranged to prevent the first leg 26 from moving along the bottom board 25 in the first direction 28.

Figure 4:
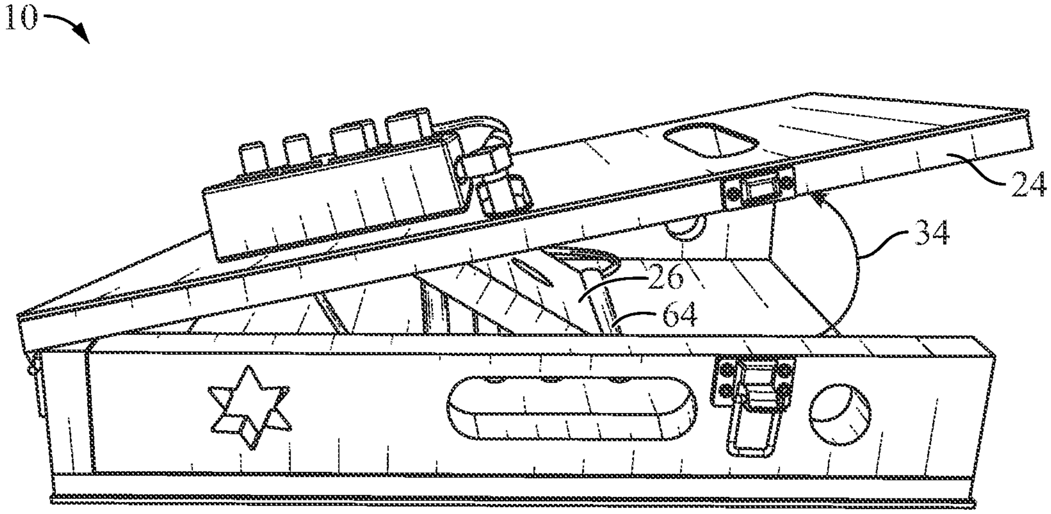
FIG. 4 illustrates a side view of an effects pedal stand that includes a platform held at a fourth angle, according to some embodiments disclosed herein.

Referring to FIG. 4, the fourth stop 64 can be constructed and arranged to receive the first leg 26 so that the platform 24 is held at a fourth angle 34 with respect to the bottom board 25. The fourth angle 34 can be smaller than the third angle 33 in FIG. 3. In some embodiments, the fourth stop 64 can be constructed and arranged to prevent the first leg 26 from moving along the bottom board 25 in the first direction 28.

Referring back to FIG. 2, in some embodiments, the first board 21 can have a first handhold 40 that is constructed and arranged to accommodate a user's hand. The second board 22 can have a second handhold 42 that is constructed and arranged to accommodate a user's hand. In some embodiments, the first board 21 can have at least one through hole 47 that is constructed and arranged to accommodate one or more cables (e.g., 92, 93 in FIG. 7). In some embodiments, the second board 22 can have at least one through hole 49 that is constructed and arranged to accommodate one or more cables (e.g., 92, 93 in FIG. 7).

In some embodiments, one or more hook and loop type fasteners 35 can be attached to the second side 46 of the platform 24. In some embodiments, the one or more hook and loop type fasteners 35 be constructed and arranged to fasten at least the effects pedal 81 to the platform 24.

Figure 5A:
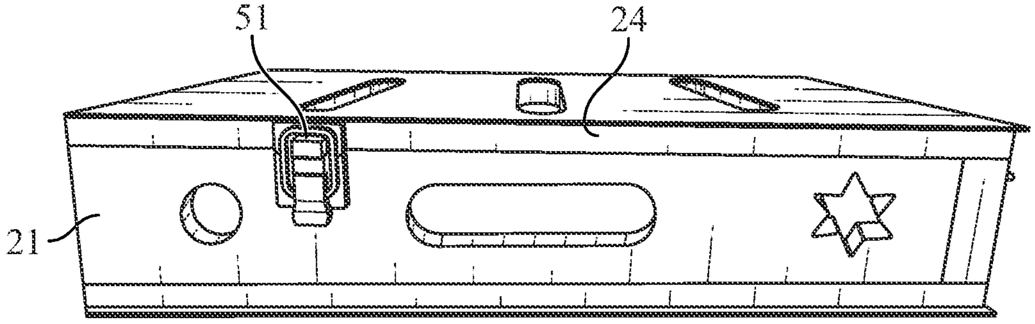
FIGS. 5A and 5B illustrate side views of an effects pedal stand with a latch, according to some embodiments disclosed herein.
Figure 5B:
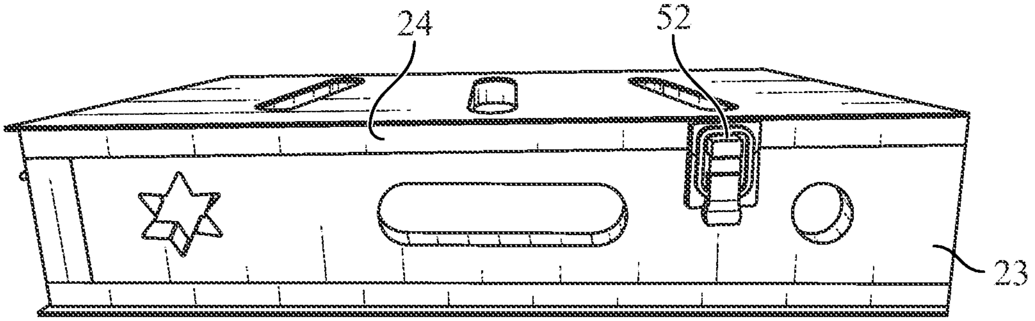

Referring to FIG. 5A, a first latch 51 can be constructed and arranged to fasten the platform 24 to the first board 21. Referring to FIG. 5B, a second latch 52 can be constructed and arranged to fasten the platform 24 to the third board 23.

Figure 6:
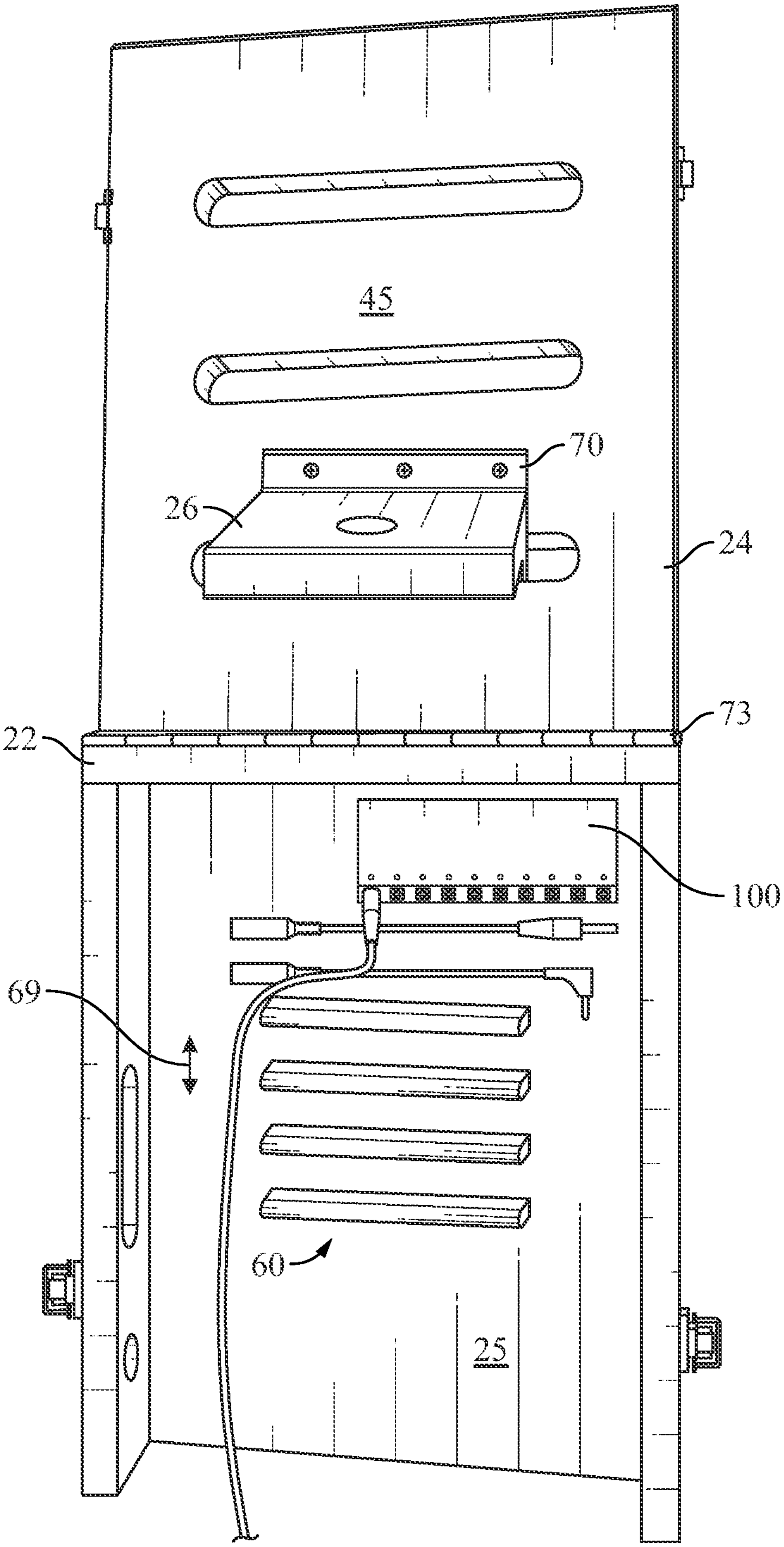
FIG. 6 illustrates an effects pedal stand that includes a platform rotated away from a bottom board, according to some embodiments disclosed herein.

Referring to FIG. 6, a first hinge 70 can rotatably connect the first leg 26 to the platform 24. The first hinge 70 can rotatably connect the first leg 26 to the first side 45 of the platform 24. In some embodiments, the first leg 26 can be constructed and arranged to rotate with respect to the platform 24. A second hinge 73 can rotatably connect the platform 24 to the second board 22. In some embodiments, the platform 24 can be constructed and arranged to rotate with respect to the second board 22.

In some embodiments, the plurality of stops 60 arranged along the bottom board 25 can be separated from each other by a distance 69. In some embodiments, any stop of the plurality of stops 60 can include a strip of material (e.g., metal, wood, plastic, etc.) on the bottom board 25. In some embodiments, any stop of the plurality of stops 60 can be formed by a recess in the bottom board 25. In some embodiments, a power supply 100 can be positioned on the bottom board 25. The power supply 100 can be constructed and arranged to electrically connect to any effects pedals (e.g., 81, 82 in FIG. 7) to provide power to the effects pedals.

Figure 7:
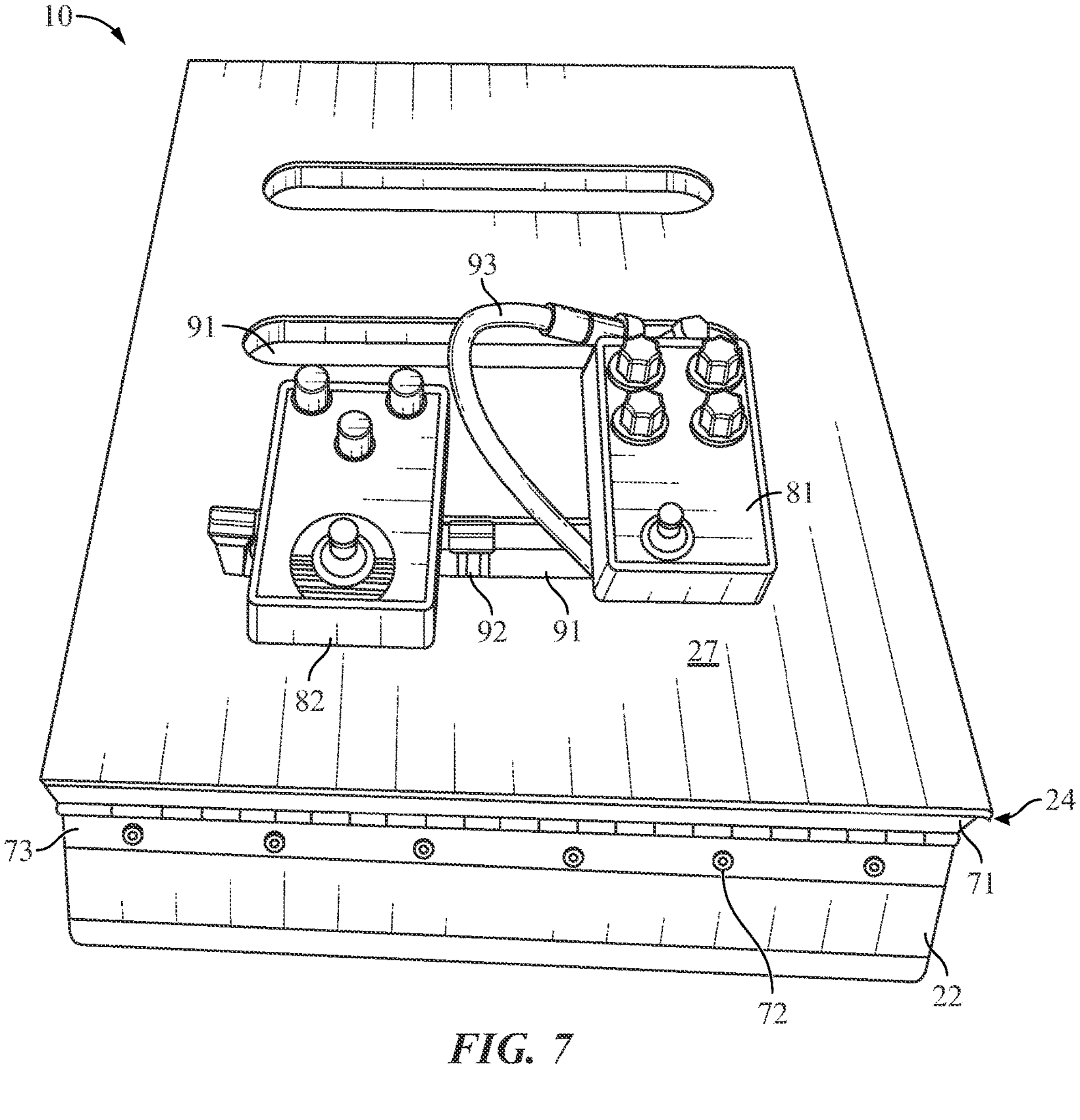
FIG. 7 illustrates one or more effects pedals positioned on an effects pedal stand, according to some embodiments disclosed herein.

Referring to FIG. 7, at least a first effects pedal 81 and a second effects pedal 82 can be positioned on the platform 24. In some embodiments, at least the first effects pedal 81 and the second effects pedal 82 can be positioned on the layer 27 of gripping material on the second side 46 of the platform 24. The platform 24 and the layer 27 of gripping material can include one or more through holes 91 constructed and arranged to accommodate any cables 92, 93 connected to the first effects pedal 81 and the second effects pedal 82. The cables 92, 93 can pass through the one or more through holes 91. In some embodiments, the one or more through holes 91 can be one or more elongate through holes 91.

In some embodiments, one or more fasteners 71 (e.g., nails, screws) can be constructed and arranged to fasten the second hinge 73 to the platform 24. In some embodiments, one or more other fasteners 72 (e.g., nails, screws) can be constructed and arranged to fasten the second hinge 73 to the second board 22.

Figure 8:
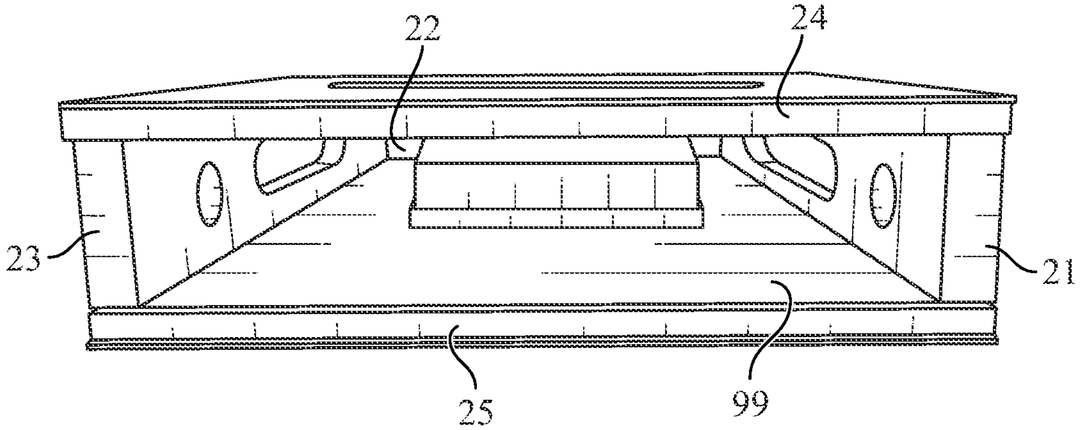
FIG. 8 illustrates a compartment in an effects pedal stand, according to some embodiments disclosed herein.

Referring to FIG. 8, in some embodiments, the platform 24 can be rotated to mate with the first board 21, the second board 22, and the third board 23 so that a compartment 99 can be at least partially defined by the first board 21, the second board 22, the third board 23, the platform 24, and the bottom board 25. In some embodiments, the compartment 99 can be constructed and arranged to store any cables (e.g., 92, 93 in FIG. 7), any effects pedals (81, 82 in FIG. 7), any power supply (e.g., 100 in FIG. 6), or any combination thereof.

The following description of variants is only illustrative of components, elements, acts, products, and methods considered to be within the scope of the invention and are not in any way intended to limit such scope by what is specifically disclosed or not expressly set forth. The components, elements, acts, products, and methods as described herein may be combined and rearranged other than as expressly described herein and are still considered to be within the scope of the invention.

According to variation 1, an effects pedal stand can include a first board; a second board attached to the first board; a third board attached to the second board; a platform rotatably connected to the second board; a bottom board attached to the first board, the second board, and the third board; a first leg rotatably connected to a bottom side of the platform; and a plurality of stops arranged along the bottom board in a first direction, wherein the plurality of stops are constructed and arranged to receive the first leg at respective positions on the bottom board along the first direction so that the platform is able to be held at respective angles relative to the bottom board.

Variation 2 can include the effects pedal stand of variation 1, wherein: the platform has one or more elongate through holes, wherein each of the one or more elongate through holes is constructed and arranged to accommodate one or more cables.

Variation 3 can include the effects pedal stand of variation 1, wherein the first board has a first handhold, and wherein the second board has a second handhold.

Variation 4 can include the effects pedal stand of variation 1, further comprising a layer of gripping material disposed on a top side opposite the bottom side of the platform.

Variation 5 can include the effects pedal stand of variation 4, wherein the layer of gripping material is made primarily of rubber.

Variation 6 can include the effects pedal stand of variation 1, further comprising: a first latch constructed and arranged to fasten the platform to the first board; and a second latch constructed and arranged to fasten the platform to the second board.

Variation 7 can include the effects pedal stand of variation 1, wherein the first board, the second board, the third board, the platform, and the bottom board at least partially define a compartment.

According to variation 8, an effects pedal stand can include a first board; a platform rotatably connected to the first board; a bottom board attached to the first board; a first leg rotatably connected to a bottom side of the platform; and a plurality of stops arranged along the bottom board in a first direction, wherein the plurality of stops are constructed and arranged to receive the first leg at respective positions on the bottom board along the first direction so that the platform is able to be held at respective angles relative to the bottom board.

Variation 9 can include the effects pedal stand of variation 8, wherein: the platform has one or more elongate through holes, wherein each of the one or more elongate through holes is constructed and arranged to accommodate one or more cables.

Variation 10 can include the effects pedal stand of variation 8, wherein the first board has a first handhold.

Variation 11 can include the effects pedal stand of variation 8, further comprising a layer of gripping material disposed on a top side opposite the bottom side of the platform.

Variation 12 can include the effects pedal stand of variation 11, wherein the layer of gripping material is made primarily of rubber.

Variation 13 can include the effects pedal stand of variation 8, further comprising a hinge that is constructed and arranged to rotatably connect the platform to the first board.

According to variation 14, an effects pedal apparatus can include a first board; a second board attached to the first board; a third board attached to the second board; a platform rotatably connected to the second board; a bottom board attached to the first board, the second board, and the third board; a first leg rotatably connected to a bottom side of the platform; a plurality of stops arranged along the bottom board in a first direction, wherein the plurality of stops are constructed and arranged to receive the first leg at respective positions on the bottom board along the first direction so that the platform is able to be held at respective angles relative to the bottom board; and at least one effects pedal positioned on the platform.

Variation 15 can include the effects pedal apparatus of variation 14, wherein: the platform has one or more elongate through holes, wherein each of the one or more elongate through holes is constructed and arranged to accommodate one or more cables.

Variation 16 can include the effects pedal apparatus of variation 14, wherein the first board has a first handhold, and wherein the second board has a second handhold.

Variation 17 can include the effects pedal apparatus of variation 14, further comprising a layer of gripping material disposed on a top side opposite the bottom side of the platform.

Variation 18 can include the effects pedal apparatus of variation 17, wherein the layer of gripping material is made primarily of rubber.

Variation 19 can include the effects pedal apparatus of variation 14, further comprising: a first latch constructed and arranged to fasten the platform to the first board; and a second latch constructed and arranged to fasten the platform to the second board.

Variation 20 can include the effects pedal apparatus of variation 14, wherein the first board, the second board, the third board, the platform, and the bottom board at least partially define a compartment.

Many different embodiments have been disclosed herein, in connection with the above description and the drawings. It will be understood that it would be unduly repetitious and obfuscating to describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

An equivalent substitution of two or more elements can be made for anyone of the elements in the claims below or that a single element can be substituted for two or more elements in a claim. Although elements can be described above as acting in certain combinations, and even initially claimed as such, it is to be expressly understood that one or more elements from a claimed combination can, in some cases, be excised from the combination and that the claimed combination can be directed to a subcombination or variation of a subcombination.

It will be appreciated by persons skilled in the art that the present embodiment is not limited to what has been particularly shown and described hereinabove. A variety of modifications and variations are possible considering the above teachings without departing from the following claims.

What is claimed is:

1. An effects pedal stand, comprising:

a first board;

a second board attached to the first board;

a third board attached to the second board;

a platform rotatably connected to the second board;

a bottom board attached to the first board, the second board, and the third board;

a first leg rotatably connected to a bottom side of the platform;

a plurality of stops arranged along the bottom board in a first direction, the plurality of stops being separated from each other by a distance, wherein the plurality of stops are constructed and arranged to receive the first leg at respective positions on the bottom board along the first direction so that the platform is able to be held at respective angles relative to the bottom board, and wherein each stop of the plurality of stops is constructed and arranged to prevent the first leg from moving along the bottom board in the first direction when the first leg is received at the respective position corresponding to that stop; and a first latch constructed and arranged to fasten the platform to the first board; and a second latch constructed and arranged to fasten the platform to the second board.

2. The effects pedal stand of claim 1, wherein:

the platform has one or more elongate through holes, wherein each of the one or more elongate through holes is constructed and arranged to accommodate one or more cables.

3. The effects pedal stand of claim 1, wherein the first board has a first handhold, and wherein the second board has a second handhold.

4. The effects pedal stand of claim 1, further comprising a layer of gripping material disposed on a top side opposite the bottom side of the platform.

5. The effects pedal stand of claim 4, wherein the layer of gripping material is made primarily of rubber.

6. The effects pedal stand of claim 1, wherein the first board, the second board, the third board, the platform, and the bottom board at least partially define a compartment.

7. An effects pedal stand, comprising:

a first board;

a second board attached to the first board;

a platform rotatably connected to the second board;

a bottom board attached to the first board and the second board;

a first leg rotatably connected to a bottom side of the platform;

a plurality of stops arranged along the bottom board in a first direction, the plurality of stops being separated from each other by a distance, wherein the plurality of stops are constructed and arranged to receive the first leg at respective positions on the bottom board along the first direction so that the platform is able to be held at respective angles relative to the bottom board, and wherein each stop of the plurality of stops is constructed and arranged to prevent the first leg from moving along the bottom board in the first direction when the first leg is received at the respective position corresponding to that stop; and a first latch constructed and arranged to fasten the platform to the first board; and a second latch constructed and arranged to fasten the platform to the second board.

8. The effects pedal stand of claim 7, wherein:

the platform has one or more elongate through holes, wherein each of the one or more elongate through holes is constructed and arranged to accommodate one or more cables.

9. The effects pedal stand of claim 7, wherein the first board has a first handhold.

10. The effects pedal stand of claim 7, further comprising a layer of gripping material disposed on a top side opposite the bottom side of the platform.

11. The effects pedal stand of claim 10, wherein the layer of gripping material is made primarily of rubber.

12. The effects pedal stand of claim 7, further comprising a hinge that is constructed and arranged to rotatably connect the platform to the firstsecond board.

13. An effects pedal apparatus, comprising:

a first board;

a second board attached to the first board;

a third board attached to the second board;

a platform rotatably connected to the second board;

a bottom board attached to the first board, the second board, and the third board;

a first leg rotatably connected to a bottom side of the platform;

a plurality of stops arranged along the bottom board in a first direction, the plurality of stops being separated from each other by a distance, wherein the plurality of stops are constructed and arranged to receive the first leg at respective positions on the bottom board along the first direction so that the platform is able to be held at respective angles relative to the bottom board, and wherein each stop of the plurality of stops is constructed and arranged to prevent the first leg from moving along the bottom board in the first direction when the first leg is received at the respective position corresponding to that stop; and a first latch constructed and arranged to fasten the platform to the first board;

a second latch constructed and arranged to fasten the platform to the second board; and at least one effects pedal positioned on the platform.

14. The effects pedal apparatus of claim 13, wherein:

the platform has one or more elongate through holes, wherein each of the one or more elongate through holes is constructed and arranged to accommodate one or more cables.

15. The effects pedal apparatus of claim 13, wherein the first board has a first handhold, and wherein the second board has a second handhold.

16. The effects pedal apparatus of claim 13, further comprising a layer of gripping material disposed on a top side opposite the bottom side of the platform.

17. The effects pedal apparatus of claim 16, wherein the layer of gripping material is made primarily of rubber.

18. The effects pedal apparatus of claim 13, wherein the first board, the second board, the third board, the platform, and the bottom board at least partially define a compartment.

* * * * *